US012169947B2

(12) United States Patent
Auer et al.

(10) Patent No.: US 12,169,947 B2
(45) Date of Patent: Dec. 17, 2024

(54) GENERATING POSE INFORMATION FOR A PERSON IN A PHYSICAL ENVIRONMENT

(71) Applicant: Apple Inc., Cupertino, CA (US)

(72) Inventors: Stefan Auer, Munich (DE); Sebastian Bernhard Knorr, Munich (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/699,341

(22) Filed: Mar. 21, 2022

(65) Prior Publication Data

US 2022/0207772 A1 Jun. 30, 2022

Related U.S. Application Data

(63) Continuation of application No. 16/883,230, filed on May 26, 2020, now Pat. No. 11,315,287.

(Continued)

(51) Int. Cl.
*G06T 7/73* (2017.01)
*G06T 7/50* (2017.01)
*G06T 13/80* (2011.01)

(52) U.S. Cl.
CPC .......... *G06T 7/75* (2017.01); *G06T 7/50* (2017.01); *G06T 13/80* (2013.01); *G06T 2207/20081* (2013.01); *G06T 2207/30196* (2013.01)

(58) Field of Classification Search
CPC ..... G06T 7/11; G06T 7/50; G06T 7/73; G06T 7/75; G06T 13/80; G06T 2207/10028;

(Continued)

(56) References Cited

U.S. PATENT DOCUMENTS 9,741,169 B1 8/2017 Holz
2008/0219509 A1* 9/2008 White ............... A63B 24/0021
382/107

(Continued)

FOREIGN PATENT DOCUMENTS

WO 2016095057 A1 6/2016
WO WO-2019171592 A1 * 9/2019

OTHER PUBLICATIONS

Liu Y, Sowmya A, Khamis H, Single camera multi-view anthropometric measurement of human height and mid-upper arm circumference using linear regression. PLoS ONE 13(4): e0195600. https://doi.org/10.1371/journal.pone.0195600 (Year: 2018).*

(Continued)

*Primary Examiner* — Diane M Wills
(74) *Attorney, Agent, or Firm* — Fernando & Partners, LLP

(57) ABSTRACT

Various implementations disclosed herein include devices, systems, and methods for generating body pose information for a person in a physical environment. In various implementations, a device includes an environmental sensor, a non-transitory memory and one or more processors coupled with the environmental sensor and the non-transitory memory. In some implementations, a method includes obtaining, via the environmental sensor, spatial data corresponding to a physical environment. The physical environment includes a person and a fixed spatial point. The method includes identifying a portion of the spatial data that corresponds to a body portion of the person. In some implementations, the method includes determining a position of the body portion relative to the fixed spatial point based on the portion of the spatial data. In some implementations, the method includes generating pose information for the person (Continued)

based on the position of body portion in relation to the fixed spatial point.

22 Claims, 8 Drawing Sheets

Related U.S. Application Data

(60) Provisional application No. 62/867,568, filed on Jun. 27, 2019.

(58) Field of Classification Search
CPC . G06T 2207/20081; G06T 2207/20084; G06T 2207/30196
See application file for complete search history.

(56) References Cited

U.S. PATENT DOCUMENTS

| | | | | |
|---|---|---|---|---|
| 2009/0129631 | A1* | 5/2009 | Faure | G06T 7/248 348/169 |
| 2010/0197390 | A1* | 8/2010 | Craig | G06V 40/20 463/30 |
| 2012/0165098 | A1* | 6/2012 | Raptis | A63F 13/213 463/36 |
| 2014/0225822 | A1 | 8/2014 | Underkoffler et al. | |
| 2015/0324951 | A1* | 11/2015 | Coon | G06T 3/40 345/420 |
| 2016/0089074 | A1* | 3/2016 | Wang | A61B 6/505 600/407 |
| 2016/0297068 | A1 | 10/2016 | Thibodeau et al. | |
| 2016/0307335 | A1 | 10/2016 | Perry et al. | |
| 2017/0109931 | A1 | 4/2017 | Knorr et al. | |
| 2018/0268513 | A1* | 9/2018 | Lashkari | G02B 27/0093 |
| 2018/0300953 | A1 | 10/2018 | Kraver et al. | |
| 2019/0094981 | A1* | 3/2019 | Bradski | H04N 21/414 |
| 2019/0188895 | A1* | 6/2019 | Miller, IV | G06T 19/006 |
| 2020/0058169 | A1* | 2/2020 | Friesenhahn | G06V 20/20 |
| 2020/0334838 | A1* | 10/2020 | Perry | G06T 7/292 |

OTHER PUBLICATIONS

Gabriele Fanelli et al., "Real time head pose estimation with random regression forests." CVPR 2011. IEEE, 2011. pp. 1-8.

Office Action for corresponding Chinese Appl. No. 202010542574.7 dated Oct. 17, 2023. (Translation of search report).

Chinese Notice of Allowance dated Feb. 27, 2024, Chinese Application No. 2020105425747, pp. 1-6 (Includes English Translation of Search Report).

* cited by examiner

GENERATING POSE INFORMATION FOR A PERSON IN A PHYSICAL ENVIRONMENT

CROSS-REFERENCE TO RELATED APPLICATIONS

This application is a continuation application of and claims priority to U.S. patent application Ser. No. 16/883,230, filed on May 26, 2020, which claims priority to U.S. Provisional Patent App. No. 62/867,568, filed on Jun. 27, 2019, which are hereby incorporated by reference in their entirety.

TECHNICAL FIELD

The present disclosure generally relates generating pose information for a person in a physical environment.

BACKGROUND

Some devices are capable of presenting computer-generated reality (CGR) experiences. For example, some head-mountable devices (HMDs) present immersive CGR experiences to a user of the HMD. Some CGR experiences require knowing a body pose of the user. For example, some CGR experiences present an avatar of the user that mimics the behavior of the user. If the user moves a portion of his/her body, the avatar moves the corresponding portion. In such CGR experiences, presenting accurate avatars requires knowing a body pose of the user. In some CGR experiences, the CGR experience is altered based on the body pose of the user. For example, as the user moves, a perspective of a CGR environment being presented changes. In such CGR experiences, providing a realistic CGR experience requires knowing a body pose of the user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
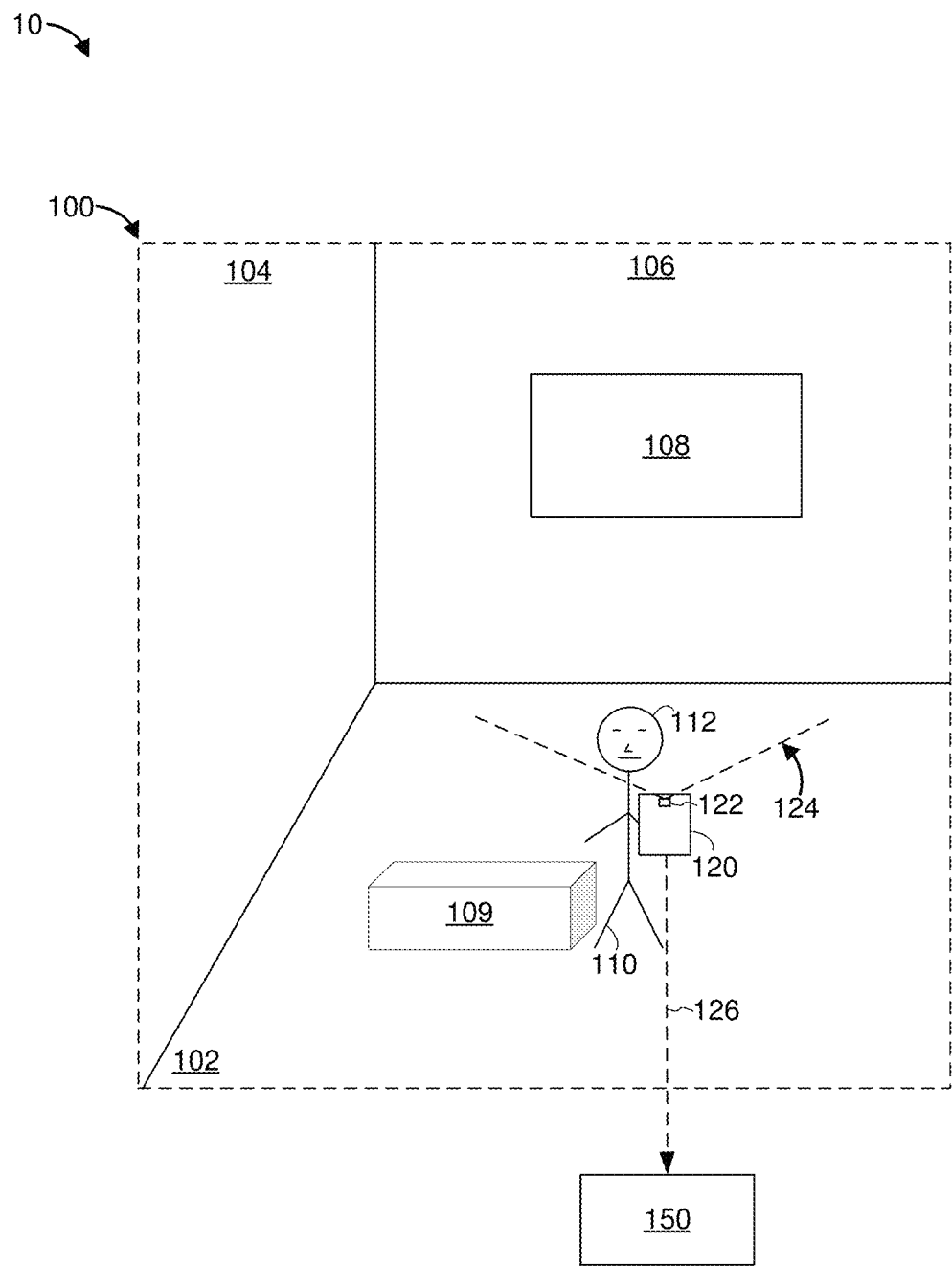
FIGS. 1A-1B are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating body pose information for a person in a physical environment. In various implementations, a device includes an environmental sensor, a non-transitory memory and one or more processors coupled with the environmental sensor and the non-transitory memory. In some implementations, a method includes obtaining, via the environmental sensor, spatial data corresponding to a physical environment. In some implementations, the physical environment includes a person and a fixed spatial point. In some implementations, the method includes identifying a portion of the spatial data that corresponds to a body portion of the person. In some implementations, the method includes determining a position of the body portion relative to the fixed spatial point based on the portion of the spatial data. In some implementations, the method includes generating pose information for the person based on the position of body portion in relation to the fixed spatial point.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for generating pose information for a person in a physical environment. The pose information is generated based on a position of a body portion of the person in relation to a fixed spatial point in the physical environment. The fixed spatial point may include a physical article (e.g., a real object in the physical environment), or a physical bounding surface (e.g., a floor, a wall, or a ceiling). Since the fixed spatial point is known, the position of the body portion in relation to the fixed spatial point indicates a body pose of the person. Positions of multiple body portions in relation to the fixed spatial point can increase the accuracy of the body pose.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a physical environment 100 with a person 110, an electronic device 120, and a controller 150. In FIG. 1A, the controller 150 is shown as being separate from the electronic device 120. However, in some implementations, the controller 150 is integrated into the electronic device 120. In the example of FIG. 1A, the electronic device 120 is being held by the person 110. In some implementations, the electronic device 120 includes a handheld device. In some implementations, the electronic device 120 includes a smartphone, a tablet, a laptop, or the like.

In various implementations, the electronic device 120 includes a wearable computing device that can be worn by the person 110. For example, in some implementations, the electronic device 120 includes an electronic watch that is worn around a wrist of the person 110. In some implementations, the electronic device 120 includes a set of one or more wearable computing devices that attach to different body portions of the person 110. For example, in some implementations, the electronic device 120 includes a left foot device (e.g., a left foot camera) that is attached to (e.g., worn around) a left foot of the person 110, a right foot device (e.g., a right foot camera) that is attached to a right foot of the person 110, a right arm device (e.g., a right arm camera) that is attached to a right arm of the person 110, a left arm device (e.g., a left arm camera) that is attached to a left arm of the person 110, and/or a head-mountable device that is attached to a head 112 of the person 110. In some implementations, the electronic device 120 and/or the controller 150 store positional information indicating a relative position (e.g., a relative location and/or a relative orientation) of at least one body portion of the person 110 (e.g., the head 112) in relation to the electronic device 120.

In the example of FIG. 1A, the physical environment 100 includes a set of one or more fixed spatial points. In some implementations, a fixed spatial point refers to a physical bounding surface (e.g., a physical boundary) of the physical environment 100. For example, the physical environment 100 includes a floor 102, a side wall 104 and a front wall 106. The floor 102, the side wall 104 and the front wall 106 include numerous fixed spatial points. In some implementations, a fixed spatial point refers to a physical article (e.g., a real object) in the physical environment 100. For example, the physical environment 100 includes a television 108 that is mounted on the front wall 106, and a couch 109. The television 108 and the couch 109 include numerous fixed spatial points. In various implementations, a fixed spatial point refers to a known and detectable geographical coordinate in the physical environment 100.

In some implementations, the electronic device 120 includes a camera 122 (e.g., a front-facing camera or a rear-facing camera). The camera 122 has a field-of-view 124. In the example of FIG. 1A, the field-of-view 124 captures the head 112 of the person 110, a portion of the floor 102, the front wall 106 and the television 108. The camera 122 captures an image 126 that includes a representation of objects that are in the field-of-view 124 of the camera 122. As such, the image 126 includes a representation of the head 112, a portion of the floor 102, the front wall 106 and the television 108. In some implementations, the controller 150 obtains the image 126 captured by the camera 122.

In some implementations, the electronic device 120 includes a set of two or more environmental sensors (e.g., image sensors such as cameras, for example, the camera 122 and another camera (not shown), and/or depth sensors such as depth cameras) that collectively capture environmental data regarding the physical environment 100 and the person 110. In some implementations, one of the environmental sensors (e.g., the camera 122) captures environmental data associated with the person 110, and another one of the environmental sensors (e.g., another camera or a depth sensor) captures environmental data associated with the physical environment 100. For example, the camera 122 captures images of the person 110, and another camera (not shown) captures images of the physical environment 100. In this example, the images captured by the other camera may not include pixels that correspond to the person 110.

Figure 1B:
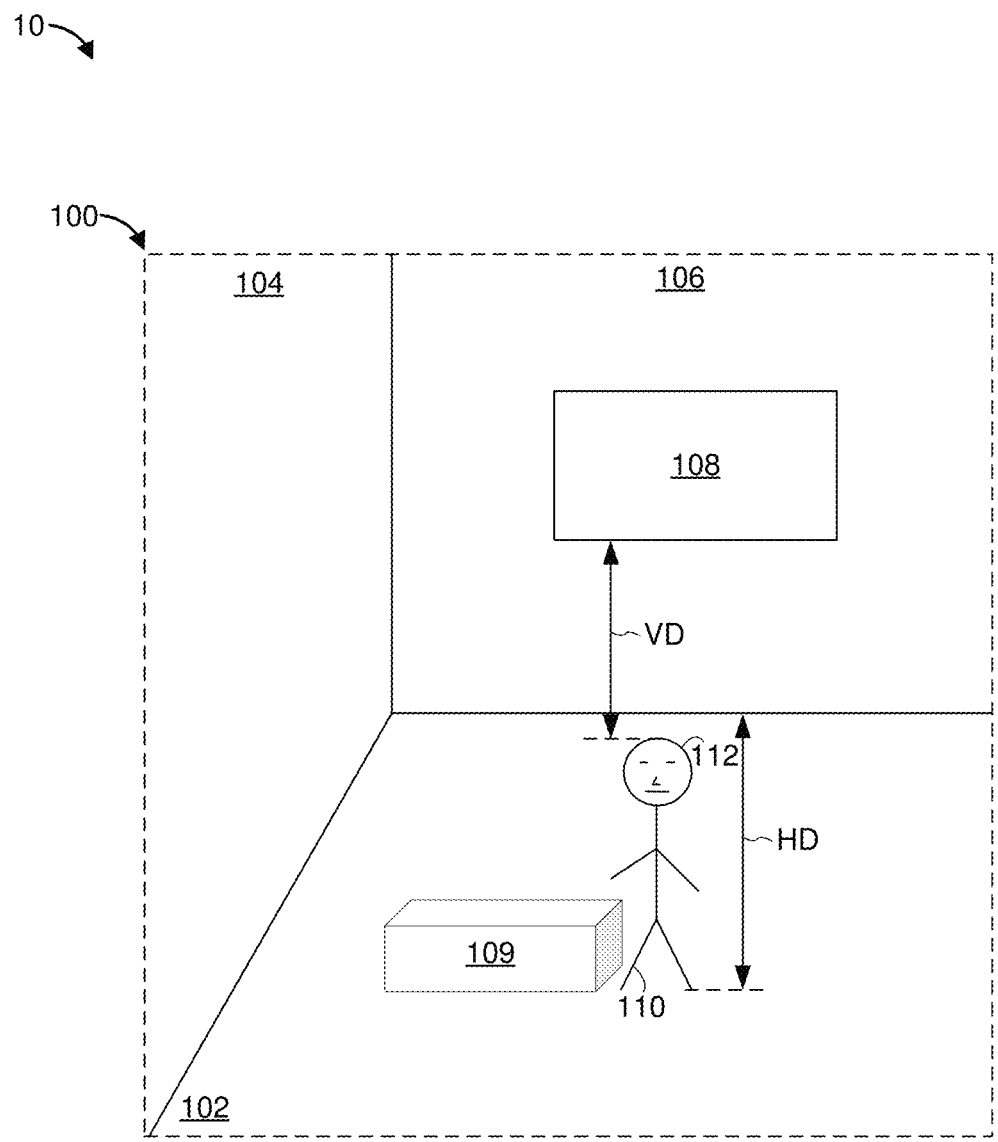

Referring to FIG. 1B, in some implementations, the controller 150 utilizes the image 126 to generate pose information 152 for the person 110. In some implementations, the pose information 152 indicates a position of the person 110 within the physical environment 100. In some implementations, the pose information 152 indicates a location of the person 110 within the physical environment 100. For example, the pose information 152 indicates that the person 110 is near the couch 109. In some implementations, the pose information 152 indicates an orientation of the person 110 within the physical environment 100. For example, the pose information 152 indicates that the person 110 is standing near the couch 109. In some implementations, the pose information 152 indicates positions (e.g., locations and/or orientations) of various body portions of the person 110. For example, the pose information 152 indicates that the head 112 of the person 110 is tilted upwards by a number of degrees.

In some implementations, the controller 150 utilizes methods, devices and/or systems associated with image processing to generate the pose information 152. In some implementations, the controller 150 utilizes methods, devices and/or systems associated with photogrammetry to generate the pose information 152. In the example of FIG. 1B, the controller 150 utilizes the image 126 to determine that there is a horizontal distance HD between the person 110 and the front wall 106. Since the couch 109 is also a horizontal distance HD away from the front wall 106, the controller 150 determines that the person 110 is near the couch 109. The controller 150 also determines that there is a vertical distance VD between the top of the head 112 and a bottom of the television 108. Based on the vertical distance VD, the controller 150 determines whether the person 110 is standing or sitting. For example, if the vertical distance VD is greater than a threshold T, then the controller 150 determines that the person 110 is sitting on the couch 109. However, if the vertical distance VD is less than the threshold T, then the controller 150 determines that the person 110 is standing near the couch 109. In the example of FIG. 1B, the vertical distance VD is less than the threshold T. As such, the controller 150 determines that the person 110 is standing instead of sitting. Hence, in the example of FIG. 1B, the pose information 152 indicates that the person 110 is standing near the couch 109.

In some implementations, the image 126 does not include pixels that correspond to a body portion of the person 110. For example, if the camera 122 is pointing up towards a ceiling of the physical environment 100, the head 112 may not be in the field-of-view 124 of the camera 122. In some implementations, the controller 150 determines the pose information 152 based on a relative position of the electronic device 120 in relation to a fixed spatial point in the physical environment 100. For example, if the camera 122 is pointing towards the ceiling and the image 126 does not include pixels corresponding to the person 110, then the controller 150 determines the pose information 152 based on a known spatial relationship between the electronic device 120 and a body portion of the person 110. For example, if the known spatial relationship is a first distance between the head 112 and the camera 122 and the image 126 indicates a second distance between the ceiling and the camera 122, then the controller 150 can determine a third distance between the head 112 and the ceiling based on the first and second distances. In this example, the controller 150 may determine whether the person 110 is sitting on the couch 109 or standing based on the third distance, and the pose information 152 can indicate whether the person 110 is sitting or standing.

In some implementations, an environmental sensor of the electronic device 120 (e.g., the camera 122) captures a body portion of the person 110 (e.g., the head 112) and the fixed spatial point in the physical environment 100 (e.g., the front wall 106) at different times (e.g., in different sensor frames, for example, in different image frames). For example, the camera 122 captures the head 112 at a first time (e.g., in a first image frame) and the front wall 106 at a second time (e.g., in a second image frame) that is different from the first time. In some implementations, the controller 150 determines (tracks) a position of the body portion relative to the fixed spatial point based on environmental data captured at different times, and generates the pose information 152 based on the position of the body portion relative to the fixed spatial point.

In some implementations, the controller 150 determines the fixed spatial point. For example, in some implementations, the controller 150 generates a semantic construction of the physical environment 100, and assigns a particular geographical coordinate in the physical environment 100 as the fixed spatial point. In some implementations, the fixed spatial point is associated with a semantic label that indicates one or more characteristics of the fixed spatial point (e.g., the semantic label indicates whether the fixed spatial point is a floor or a table). In some implementations, the controller 150 obtains (e.g., generates, retrieves or receives) the semantic labels.

In some implementations, the fixed spatial point is associated with a set of two or more coordinates (e.g., three coordinates), and the controller 150 utilizes a subset of the set of two of more coordinates. For example, in some implementations, the controller 150 utilizes one of the set of two or more coordinates. As an example, the controller 150 may determine a distance along a gravity axis between the electronic device 120 and the fixed spatial point (e.g., the television 108). In this example, the controller 150 determines a one-dimensional (1D) distance (e.g., a distance along one axis) instead of a three-dimensional (3D) distance (e.g., a distance along three axis).

In some implementations, the person 110 is wearing a head-mountable device (HMD). In some implementations, the HMD includes a sensor that captures sensor data (e.g., images and/or depth data). In some implementations, the sensor includes an IMU, a front-facing camera and/or a depth sensor. The controller 150 obtains the sensor data from the HMD, and generates the pose information 152 based on the sensor data. In various implementations, the HMD operates in substantially the same manner as the electronic device 120 shown in FIGS. 1A and 1B. In some implementations, the HMD performs substantially the same operations as the electronic device 120 shown in FIGS. 1A and 1B. In some implementations, the HMD includes a head-mountable enclosure. In some implementations, the head-mountable enclosure is shaped to form a receptacle for receiving an electronic device with a display (e.g., the electronic device 120 shown in FIGS. 1A and 1B). For example, in some implementations, the electronic device 120 shown in FIGS. 1A and 1B can be slid into the HMD. In some implementations, the HMD includes an integrated display for presenting a CGR experience to the person 110. In some implementations, the controller 150 is integrated into the HMD.

Figure 2:
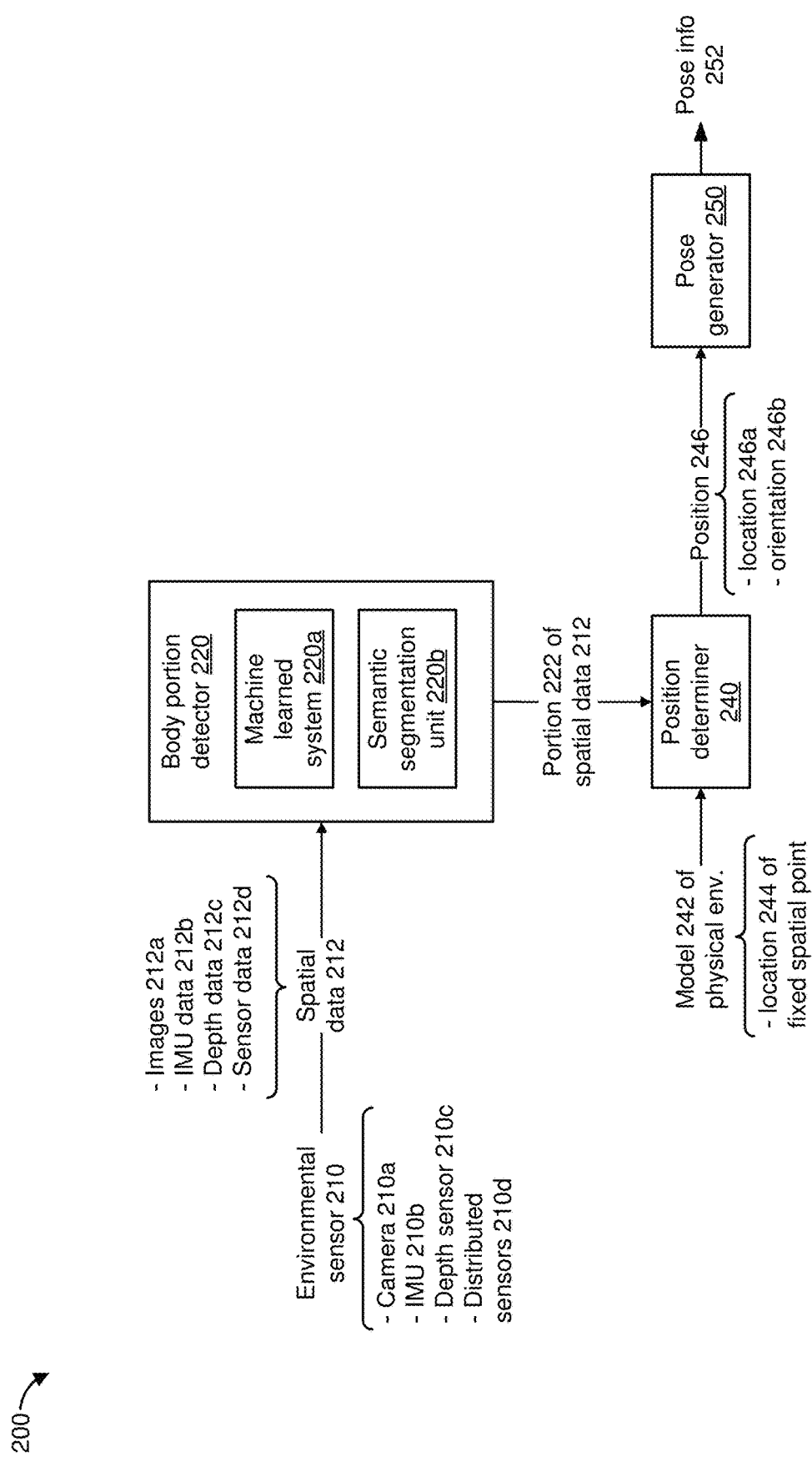
FIG. 2 is a block diagram of an example system in accordance with some implementations.

FIG. 2 is a block diagram of an example device 200 that generates pose information 252 (e.g., the pose information 152 shown in FIG. 1B) for a person. In some implementations, the device 200 implements the controller 150 shown in FIGS. 1A-1B. In some implementations, the device 200 implements the electronic device 120 shown in FIGS. 1A-1B. In some implementations, the device 200 implements an HMD. In some implementations, the device 200 includes an environmental sensor 210, a body portion detector 220, a position determiner 240, and a pose generator 250.

In some implementations, the environmental sensor 210 captures spatial data 212 corresponding to a physical environment (e.g., the physical environment 100 shown in FIGS. 1A-1B). In some implementations, the environmental sensor 210 includes an image sensor such as a camera 210a that captures images 212a (e.g., the image 126 shown in FIG. 1A). In some implementations, the environmental sensor 210 includes an IMU 210b that captures IMU data 212b. In some implementations, the environmental sensor 210 includes a depth sensor 210c (e.g., a depth camera) that captures depth data 212c. In some implementations, the environmental sensor 210 includes a set of distributed sensors 210d that capture sensor data 212d. In some implementations, the set of distributed sensors 210d are distributed (e.g., positioned, for example, spread out) throughout a physical environment.

In some implementations, the spatial data 212 indicates that the physical environment includes a person (e.g., the person 110 shown in FIGS. 1A-1B), and a fixed spatial point (e.g., a physical bounding surface such as the floor 102, the side wall 104 and/or the front wall 106, and/or a physical article such as the television 108 and/or the couch 109). The spatial data 212 includes representations of the person and the fixed spatial point. For example, if the spatial data 212 includes images 212a, then the images 212a include pixels corresponding to the person and the fixed spatial point.

In some implementations, the body portion detector 220 identifies a portion 222 of the spatial data 212 that corresponds to a body portion of the person. In some implementations, body portions includes limbs (e.g., arms and feet), joints (e.g., shoulder joint, elbow, wrist, knee, ankle, hip, etc.), torso, head and/or neck.

In some implementations, the body portion detector 220 includes a machine learned system 220a that identifies the portion 222 of the spatial data 212 corresponding to a body portion of the person. The machine learned system 220a obtains the spatial data 212 as an input and identifies the portion 222 of the spatial data 212 as an output. In some implementations, the machine learned system 220a generates pixel characterization vectors for pixels in the images 212a. In some implementations, the machine learned system 220a determines that a set of pixels correspond to a body portion when the pixel characterization vectors for the set of pixels satisfy an object confidence threshold. In some implementations, the object confidence threshold is satisfied when the pixel characterization vectors for the set of pixels include label values that are within a degree of similarity. For example, when the pixel characterization vectors for a set of pixels include label values corresponding to a forearm, then the machine learned system 220a determines that the set of pixels correspond to a forearm. In some implementations, the machine learned system 220a is trained with training data includes labeled images of body portions.

In some implementations, the body portion detector 220 includes semantic segmentation unit 220b that identifies the portion 222 of the spatial data 212 corresponding to a body portion of the person. In some implementations, the semantic segmentation unit 220b performs semantic segmentation on the spatial data 212 to identify the portion 222 of the spatial data 212 corresponding to the body portion. For example, in some implementations, the semantic segmentation unit 220b utilizes the spatial data 212 to generate three-dimensional (3D) point clouds ("point clouds", hereinafter for the sake of brevity) for the physical environment. In some implementations, the semantic segmentation unit 220b generates point characterization vectors for each point. In some implementations, the semantic segmentation unit 220b generates semantic labels for the point clouds. The semantic segmentation unit 220b generates the semantic label for a particular point cloud in response to the points in the point cloud satisfying an object confidence threshold (e.g., when a threshold number of point characterization vectors associated with the point cloud include label values that are within a degree of similarity). As an example, the semantic segmentation unit 220b labels a particular point cloud as a torso when a threshold number of point characterization vectors in that particular point cloud include label values that correspond to a torso. In various implementations, the semantic segmentation unit 220b utilizes a neural network system to identify the portion 222 of the spatial data 212.

In some implementations, the position determiner 240 determines a position 246 of the body portion in relation the fixed spatial point. In some implementations, the position determiner 240 obtains a model 242 of the physical environment. The model 242 identifies the fixed spatial point and a location 244 of the fixed spatial point. For example, the model 242 identifies a physical bounding surface such as the floor 102, the side wall 104 and/or the front wall 106, and/or a physical article such as the television 108 and/or the couch 109 shown in FIGS. 1A-1B.

In some implementations, the position determiner 240 utilizes methods, devices and/or systems associated with image processing to determine the position 246. In some implementations, the position determiner 240 utilizes methods, devices and/or systems associated with photogrammetry to determine the position 246. In some implementations, the position 246 includes a location 246a of the body portion in relation to the fixed spatial point. For example, the position 246 includes a distance of the body portion from the fixed spatial point (e.g., the horizontal distance HD and/or the vertical distance VD shown in FIG. 1B). In some implementations, the position 246 includes an orientation 246b of the body portion in relation to the fixed spatial point (e.g., whether the head 112 is facing towards the television 108 or away from the television 108).

In some implementations, the pose generator 250 generates the pose information 252 for the person based on the position 246 of the body portion in relation to the fixed spatial point. In some implementations, the pose information 252 indicates positions and/or orientations of various body portions relative to each other. For example, in some implementations, the pose information 252 includes angular positions of various body joints. In some implementations, the position determiner 240 determines the positions of body portions relative to each other, and the pose generator 250 utilizes the relative positions of the body portions to generate the pose information 252. In some implementations, the position determiner 240 determines respective positions of various body portions, and the pose generator 250 utilizes the respective positions to the various body portions to increase an accuracy of the pose information 252 and/or to increase a granularity of the pose information 252.

In some implementations, the pose generator 250 provides the pose information 252 to a rendering and display pipeline. In some implementations, the rendering and display pipeline utilizes the pose information to manipulate a CGR representation of the person 110 in a CGR environment. In some implementations, the pose generator 250 transmits the pose information 252 to another device which utilizes the pose information 252 to render the CGR representation of the person 110.

Figure 3:
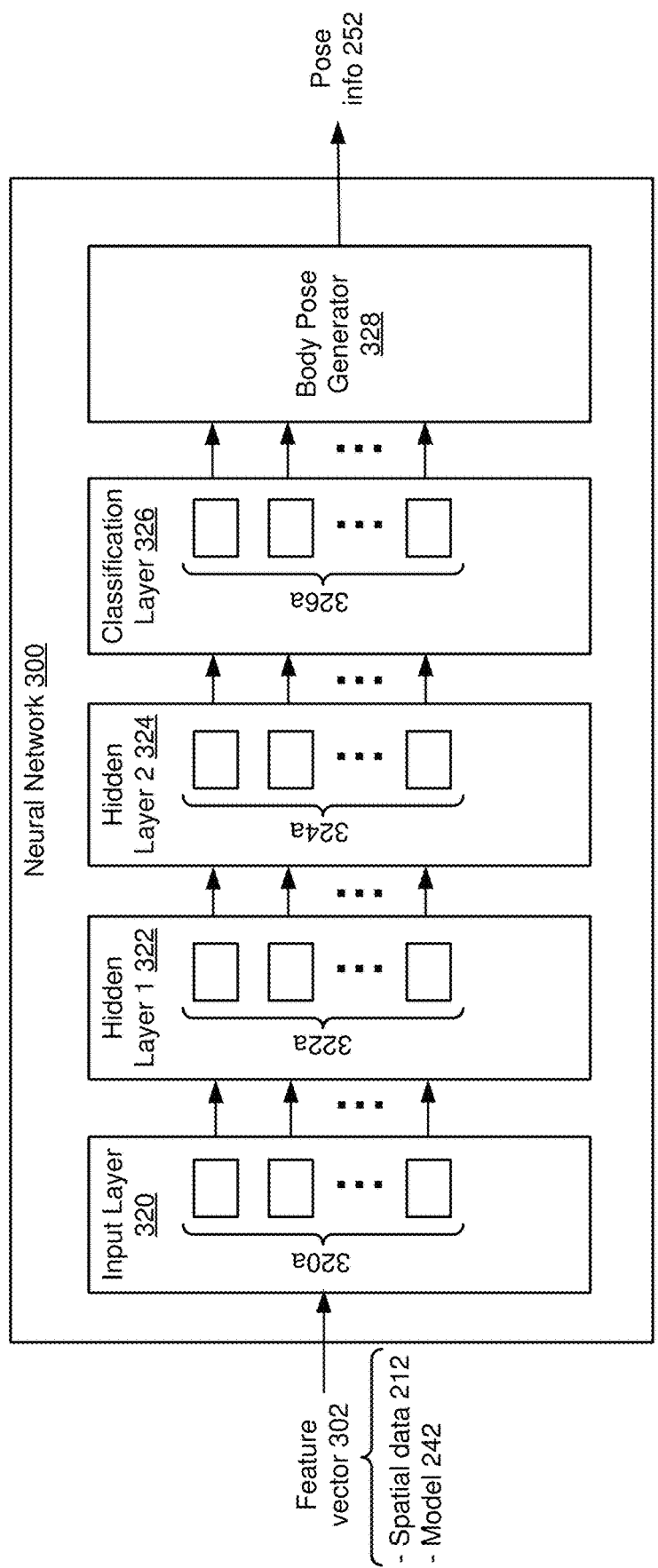
FIG. 3 is a block diagram of an example neural network in accordance with some implementations.

FIG. 3 is a block diagram of the neural network 300 in accordance with some implementations. In the example of FIG. 3, the neural network 300 includes an input layer 320, a first hidden layer 322, a second hidden layer 324, a classification layer 326, and a body pose generator 328. While the neural network 300 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications. In some implementations, the neural network 300 implements portions of the electronic device 120, an HMD, the controller 150, and/or the device 200.

In various implementations, the input layer 320 is coupled (e.g., configured) to receive various inputs. In the example of FIG. 3, the input layer 320 receives inputs indicating the spatial data 212 and/or the model 242. In some implementations, the neural network 300 includes a feature extraction module (not shown) that generates a feature stream (e.g., a feature vector 302) based on the spatial data 212 and/or the model 242. In such implementations, the feature extraction module provides the feature stream to the input layer 320. As such, in some implementations, the input layer 320 receives a feature stream that is a function of the spatial data 212 and/or the model 242. In various implementations, the input layer 320 includes a number of LSTM logic units 320a, which are also referred to as model(s) of neurons by those of ordinary skill in the art. In some such implementations, an input matrix from the features to the LSTM logic units 320a include rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of candidate body poses. In some implementations, the number of candidate body poses is approximately equal to a number of possible body poses. In some implementations, the candidate body poses are associated with corresponding confidence scores which include a probability or a confidence measure for the corresponding candidate body pose based on the spatial data 212.

In some implementations, the body pose generator 328 generates the pose information 252 by selecting the top N candidate body poses provided by the classification layer 326. For example, in some implementations, the body pose generator 328 selects the candidate body pose with the highest confidence score. In some implementations, the top N candidate body poses are the most likely body poses based on the spatial data 212. In some implementations, the body pose generator 328 provides the pose information 252 to a rendering and display pipeline.

In some implementations, the neural network 300 generates the pose information 252 based on historical pose information. For example, in some implementations, the feature vector 302 includes the historical pose information. Generating the pose information 252 based on historical pose information allows the pose information 252 to represent a smooth body pose motion over time that appears more natural and continuous. Utilizing historical pose information to generate the pose information 252 reduces a likelihood of generating incomplete, noisy and/or discontinuous body poses (e.g., reducing the likelihood of showing the left foot in a first time frame and rendering the left foot invisible in a subsequent time frame). In some implementations, the neural network 300 stores the historical pose information (e.g., as an internal state in recurrent units of the neural network 300).

In some implementations, the controller 150, the device 200 and/or the neural network 300 utilize reinforcement learning. In such implementations, the controller 150, the device 200 and/or the neural network 300 output actions for a CGR representation of the person 110. In some implementations, the actions include adjustments to joint angles of the CGR representation of the person 110.

In some implementations, the neural network 300 utilizes a regression operation to generate the pose information 252. In a regression operation, the neural network 300 synthesizes the pose information 252 (e.g., instead of selecting the pose information 252 from a set of candidate poses). In some implementations, the neural network 300 outputs a value for each articulated degree of freedom of a CGR representation of the person 110 (e.g., joint orientations and/or positions). In some implementations, the controller 150, the device 200 and/or the neural network 300 classify an action of the person 110. In some implementations, the controller 150, the device 200 and/or the neural network 300 perform a classification operation in order to determine whether a body portion of the person 110 is in contact with the physical environment 100.

In some implementations, the neural network 300 is trained using motion capture data with information regarding the physical environment 100. In some implementations, the training of the neural network 300 is supervised by an operator (e.g., a human operator). In some implementations, the training includes reinforcement learning with awards for reproducing positions of detected body portions, staying in the natural motion space, and interacting with the physical environment in a target manner.

Figure 1B:
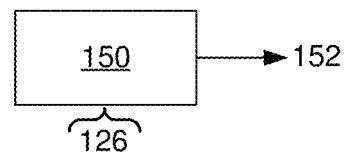
Figure 4A:
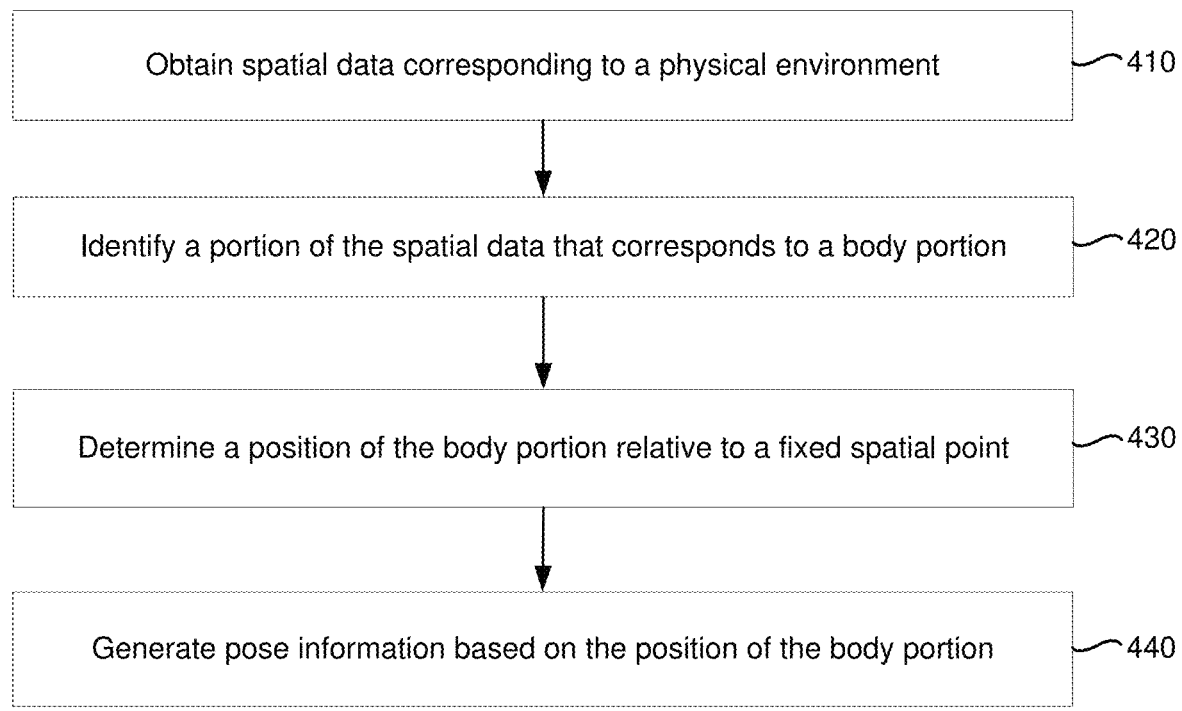
FIGS. 4A-4C are flowchart representations of a method of generating pose information in accordance with some implementations.

FIG. 4A is a flowchart representation of a method 400 of generating pose information for a person. In various implementations, the method 400 is performed by a device with an environmental sensor, a non-transitory memory and one or more processors coupled with the environmental sensor and the non-transitory memory (e.g., the electronic device 120, an HMD, the controller 150 and/or the device 200 shown in FIGS. 1A-2, respectively). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 410, in various implementations, the method 400 includes obtaining, via the environmental sensor, spatial data corresponding to a physical environment (e.g., the images 126 shown in FIG. 1A and/or the spatial data 212 shown in FIG. 2). In some implementations, the physical environment includes a person and a fixed spatial point (e.g., the person 110, and the physical articles and/or physical bounding surfaces shown in the physical environment 100).

As represented by block 420, in some implementations, the method 400 includes identifying a portion of the spatial data that corresponds to a body portion of the person. For example, as shown in FIG. 2, the body portion detector 220 identifies the portion 222 of the spatial data 212 corresponding to the body portion. In some implementations, the method 400 includes distinguishing a portion of the spatial data corresponding to the body portion from the remainder of the spatial data that does not correspond to the body portion. In some implementations, the method 400 includes detecting a representation of the body portion in the spatial data. In some implementations, body portions include joints, limbs, torso, head, neck, etc.

As represented by block 430, in some implementations, the method 400 includes determining a position of the body portion relative to the fixed spatial point based on the portion of the spatial data. For example, as shown in FIG. 2, the position determiner 240 determines the position 246 of the body portion based on the portion 222 of the spatial data 212 corresponding to the body portion.

As represented by block 440, in some implementations, the method 400 includes generating pose information for the person based on the position of the body portion in relation to the fixed spatial point. For example, as shown in FIG. 2, the pose generator 250 generates the pose information 252 based on the position 246 of the body portion in relation to the fixed spatial point.

Figure 4B:
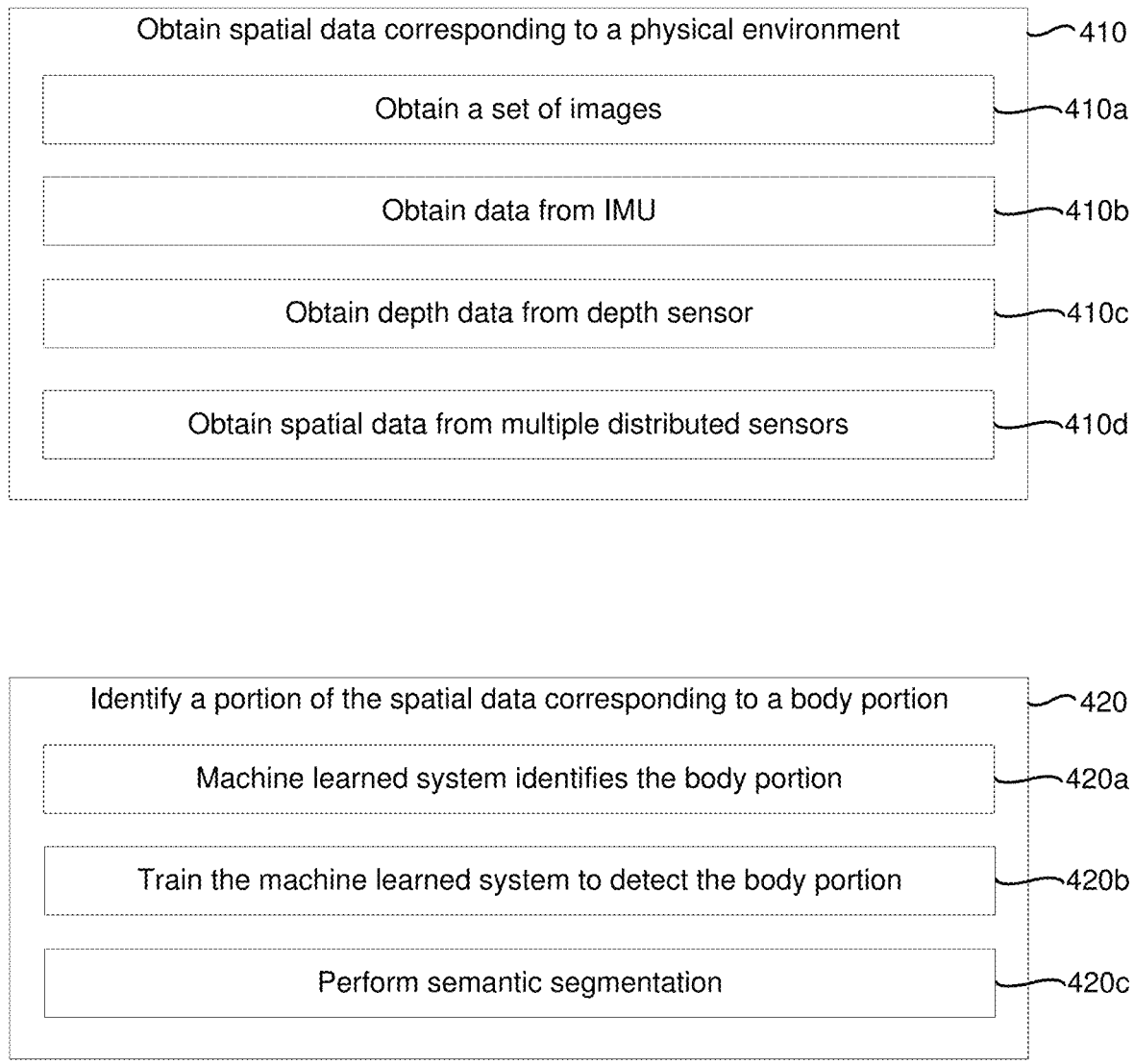

Referring to FIG. 4B, as represented by block 410*a*, in some implementations, the environmental sensor includes an image sensor (e.g., a camera, for example, the camera 122 shown in FIG. 1A and/or the camera 210*a* shown in FIG. 2), and the method 400 includes obtaining a set of one or more images from the image sensor (e.g., obtaining the images 126 shown in FIG. 1A and/or the images 212*a* shown in FIG. 2).

As represented by block 410*b*, in some implementations, the environmental sensor includes an inertial measuring unit (IMU) (e.g., the IMU 210*b* shown in FIG. 2), and the method 400 includes obtaining IMU data from the IMU (e.g., obtaining the IMU data 212*b* from the IMU 210*b* shown in FIG. 2).

As represented by block 410*c*, in some implementations, the environmental sensor includes a depth sensor (e.g., a depth camera), and the method 400 includes obtaining depth data from the depth sensor. For example, as shown in FIG. 2, the environmental sensor 210 includes a depth sensor 210*c*, and the spatial data 212 includes depth data 212*c*.

As represented by block 410*d*, in some implementations, the environmental sensor includes a set of distributed sensors, and the method 400 includes obtaining sensor data from the set of distributed sensors. For example, as shown in FIG. 2, the environmental sensor 210 includes a set of distributed sensors 210*d*, and the spatial data 212 includes sensor data 212*d* captured by the set of distributed sensors 210*d*.

As represented by block 420*a*, in some implementations, the spatial data includes a set of images, and the method 400 includes identifying the body portion by providing the set of images to a machine learned system that identifies the body portion. For example, as shown in FIG. 2, the spatial data 212 includes the images 212*a* which are provided as an input to the machine learned system 220*a* that identifies the portion 222 of the spatial data 212 corresponding to the body portion.

As represented by block 420*b*, in some implementations, the method 400 includes training the machine learned system by providing training data that include labeled images of body portions. For example, in some implementations, the method 400 includes providing the machine learned system 220*a* with images of human heads that are labeled as 'head', images of forearms that are labeled as 'forearm', images of knees that are labeled as 'knee', etc.

As represented by block 420*c*, in some implementations, the method 400 includes performing semantic segmentation on the spatial data in order to detect the fixed spatial point and/or the body portion of the person. For example, as shown in FIG. 2, the semantic segmentation unit 220*b* performs semantic segmentation on the spatial data 212 (e.g., the images 212*a*) in order to identify the portion 222 of the spatial data corresponding to the body portion.

Figure 4C:
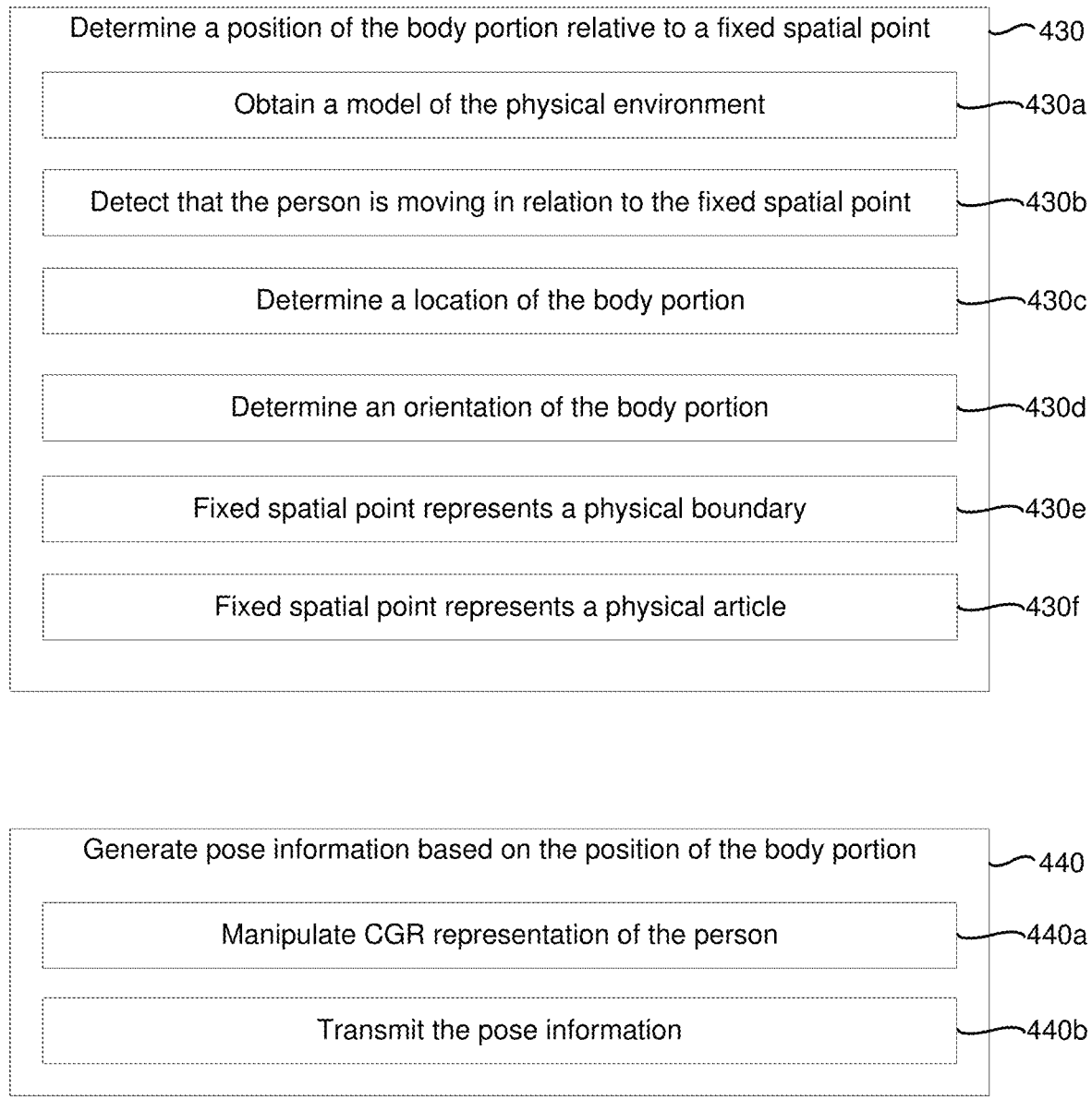

Referring to FIG. 4C, as represented by block 430*a*, in some implementations, the method 400 includes obtaining a model of the physical environment (e.g., the model 242 shown in FIG. 2). In some implementations, the model identifies the fixed spatial point and indicates a location of the fixed spatial point within the physical environment. For example, the model 242 indicates the location 244 of the fixed spatial point.

As represented by block 430*b*, in some implementations, the method 400 includes detecting that the person is moving in relation to the fixed spatial point based on a change in a distance between the body portion and the fixed spatial point. For example, detecting that the person 110 is moving in relation to the television 108 based on a change in the horizontal distance HD shown in FIG. 1B.

As represented by block 430*c*, in some implementations, the method 400 includes detecting a location of the body portion in relation to the fixed spatial point. For example, as shown in FIG. 2, in some implementations, the position 246 of the body portion includes the location 246*a* of the body portion in relation to the fixed spatial point.

As represented by block 430*d*, in some implementations, the method 400 includes detecting an orientation of the body portion in relation to the fixed spatial point. For example, as shown in FIG. 2, in some implementations, the position 246 of the body portion includes the orientation 246*b* of the body portion in relation to the fixed spatial point.

As represented by block 430*e*, in some implementations, the fixed spatial point represents a physical boundary of the physical environment. For example, in some implementations, the fixed spatial point represents a physical bounding surface such as the floor 102, the side wall 104 and/or the front wall 106 shown in FIGS. 1A-1B.

As represented by block 430*f*, in some implementations, the fixed spatial point represents a physical article that is located within the physical environment. For example, the fixed spatial point includes the television 108 and/or the couch 109 shown in FIGS. 1A-1B.

As represented by block 440*a*, in some implementations, the method 400 includes manipulating a CGR representation of the person in accordance with the pose information. In some implementations, the method 400 includes moving a CGR object representing the person in a CGR environment in order to mimic the person's movements in the physical environment.

As represented by block 440*b*, in some implementations, the method 400 includes transmitting the pose information. In some implementations, the method 400 includes transmitting the pose information to another device that displays a CGR representation of the person in accordance with the pose information.

Figure 5:
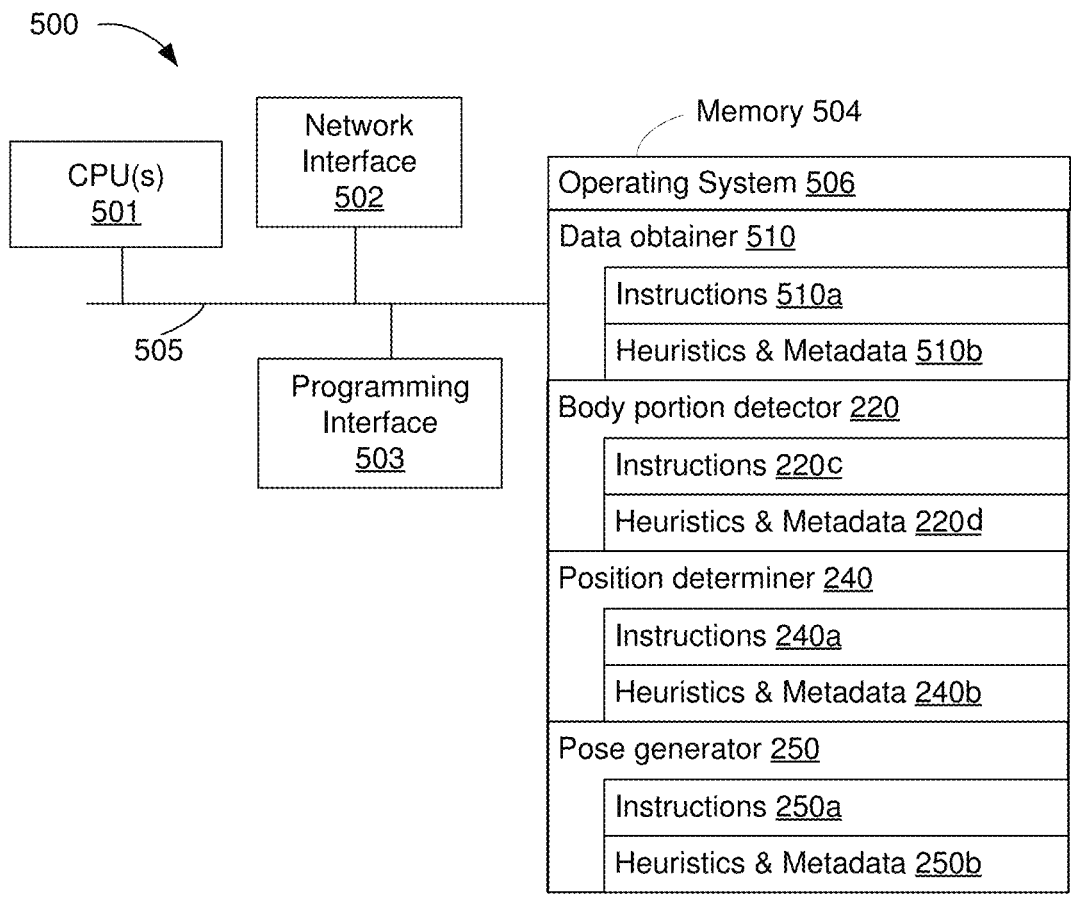
FIG. 5 is a block diagram of a device that generates pose information in accordance with some implementations.

FIG. 5 is a block diagram of a device 500 that generates pose information for a person in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a data obtainer 510, the body portion detector 220, the position determiner 240, and the pose generator 250. In various implementations, the device 500 performs the method 400 shown in FIGS. 4A-4C. In various implementations, the device 500 implements the electronic device 120, an HMD, the controller 150 and/or the device 200.

In some implementations, the data obtainer 510 obtains spatial data corresponding to a physical environment. In some implementations, the data obtainer 510 performs the operation(s) represented by block 410 in FIGS. 4A and 4B. To that end, the data obtainer 510 includes instructions 510a, and heuristics and metadata 510b.

As described herein, in some implementations, the body portion detector 220 identifies a portion of the spatial data that corresponds to a body portion of the person. In some implementations, the body portion detector 220 performs the operations(s) represented by block 420 in FIGS. 4A and 4B. To that end, the body portion detector 220 includes instructions 220c, and heuristics and metadata 220d.

In some implementations, the position detector 240 determines a position of the body portion relative to the fixed spatial point based on the portion of the spatial data. In some implementations, the position detector 240 performs the operations represented by block 430 in FIGS. 4A and 4C. To that end, the position detector 240 includes instructions 240a, and heuristics and metadata 240b.

In some implementations, the pose generator 250 generates pose information for the person based on the position of the body portion in relation to the fixed spatial point. In some implementations, the pose generator 250 performs the operations represented by block 440 in FIGS. 4A and 4C. To that end, the pose generator 250 includes instructions 250a, and heuristics and metadata 250b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including an environmental sensor, a non-transitory memory, and one or more processors coupled with the environmental sensor and the non-transitory memory:
while the device is in a physical environment that includes a fixed spatial point and a person having a plurality of body portions:
obtaining, via the environmental sensor, first spatial data corresponding to a first field-of-view of the environmental sensor that includes the fixed spatial point;
determining a first position of a first body portion of the plurality of body portions relative to the fixed spatial point based at least in part on the first spatial data, wherein determining the first position is based on a distance between the device and the fixed spatial point and based on a distance between the device and the first body portion;
generating, based on the first position of the first body portion, first pose information for the plurality of body portions that indicates respective first positions of the plurality of body portions;

obtaining, via the environmental sensor, second spatial data corresponding to a second field-of-view of the environmental sensor that includes the fixed spatial point;

determining a second position of the first body portion relative to the fixed spatial point different than the first position of the first body portion;

generating, based on the second position of the first body portion, second pose information for the plurality of body portions that indicates respective second positions of the plurality of body portions; and causing display of a virtual object having a corresponding plurality of virtual body portions moving from the first respective positions to the second respective positions.

2. The method of claim 1, wherein the spatial data includes a set of images; and
wherein determining the first position of the first body portion comprises providing the set of images to a machine learned system that identifies the first position of the first body portion relative to the fixed spatial point.

3. The method of claim 2, further comprising:
training the machine learned system by providing training data that includes labeled images of body portions.

4. The method of claim 1, further comprising:
performing semantic segmentation on the spatial data in order to detect the fixed spatial point and the first body portion.

5. The method of claim 1, further comprising:
obtaining a model of the physical environment, wherein the model identifies the fixed spatial point and indicates a location of the fixed spatial point within the physical environment.

6. The method of claim 1, wherein the fixed spatial point represents a physical boundary of the physical environment.

7. The method of claim 1, wherein the environmental sensor includes an image sensor, and the spatial data includes a set of one or more images.

8. The method of claim 1, wherein the environmental sensor includes an inertial measuring unit (IMU), and the spatial data includes IMU data.

9. The method of claim 1, wherein the environmental sensor includes a depth sensor, and the spatial data includes depth data.

10. The method of claim 1, wherein the environmental sensor includes a set of distributed sensors, and the spatial data includes data from the set of distributed sensors.

11. The method of claim 1, wherein the device includes a head-mountable device (HMD).

12. The method of claim 1, wherein generating the first pose information for the plurality of body portions comprises:
obtaining a relative position of a second body portion with respect to the first body portion; and
generating the pose information for the plurality of body portions based on the relative position of the second body portion with respect to the first body portion.

13. The method of claim 1, wherein generating the first pose information for the plurality of body portions comprises:
obtaining historical pose information for the plurality of body portions; and
generating the pose information for the plurality of body portions based further on the historical pose information, wherein the historical pose information and the first pose information collectively represent a continuous motion of the person over a period of time.

14. The method of claim 1, further comprising:
identifying a portion of the first spatial data that corresponds to the first body portion; and
determining the first position of the first body portion relative to the fixed spatial point based on the portion of the first spatial data that corresponds to the first body portion.

15. The method of claim 1, wherein determining the first position of the first body portion comprises determining a first location and a first orientation of the first body portion; and
wherein determining respective first positions of the plurality of body portions comprises determining respective first locations of the plurality of body portions and determining respective first orientations of the plurality of body portions.

16. The method of claim 1, wherein the first spatial data includes none of the plurality of body portions.

17. The method of claim 1, wherein the virtual object is an avatar representing the person.

18. The method of claim 1, wherein causing display of the virtual object moving from the first respective positions to the second respective positions includes displaying, on a display, the virtual object moving in an environment.

19. The method of claim 1, wherein causing display of the virtual object moving from the first respective positions to the second respective positions includes transmitting the first pose information and second pose information.

20. The method of claim 1, wherein the plurality of body portions includes a second body portion, wherein the first spatial data does not include the first body portion, wherein the first spatial data includes the second body portion, and wherein determining the first position of the first body portion is based on the second body portion of the first spatial data.

21. A device comprising:
one or more processors;
a non-transitory memory;
an environmental sensor; and
one or more programs stored in the non-transitory memory, which, when executed by the one or more processors, cause the device to:
while the device is in a physical environment that includes a fixed spatial point and a person having a plurality of body portions:
obtain, via the environmental sensor, first spatial data corresponding to a first field-of-view of the environmental sensor that includes the fixed spatial point;
determine a first position of a first body portion of the plurality of body portions relative to the fixed spatial point based at least in part on the first spatial data, wherein determining the first position is based on a distance between the device and the fixed spatial point and based on a distance between the device and the first body portion;
generate, based on the first position of the first body portion, first pose information for the plurality of body portions that indicates respective first positions of the plurality of body portions;
obtain, via the environmental sensor, second spatial data corresponding to a second field-of-view of the environmental sensor that includes the fixed spatial point;

determining a second position of the first body portion relative to the fixed spatial point different than the first position of the first body portion;

generating, based on the second position of the first body portion, second pose information for the plurality of body portions that indicates respective second positions of the plurality of body portions; and causing display of a virtual object having a corresponding plurality of virtual body portions moving from the first respective positions to the second respective positions.

22. A non-transitory memory storing one or more programs, which, when executed by one or more processors of a device with an environmental sensor, cause the device to:

while the device is in a physical environment that includes a fixed spatial point and a person having a plurality of body portions:

obtain, via the environmental sensor, first spatial data corresponding to a first field-of-view of the environmental sensor that includes the fixed spatial point;

determine a first position of a first body portion of the plurality of body portions relative to the fixed spatial point based at least in part on the first spatial data, wherein determining the first position is based on a distance between the device and the fixed spatial point and based on a distance between the device and the first body portion;

generate, based on the first position of the first body portion, first pose information for the plurality of body portions that indicates respective first positions of the plurality of body portions; and obtain, via the environmental sensor, second spatial data corresponding to a second field-of-view of the environmental sensor that includes the fixed spatial point;

determine a second position of the first body portion relative to the fixed spatial point different than the first position of the first body portion;

generating, based on the second position of the first body portion, second pose information for the plurality of body portions that indicates respective second positions of the plurality of body portions; and causing display of a virtual object having a corresponding plurality of virtual body portions moving from the first respective positions to the second respective positions.

* * * * *